March 15, 1966 S. H. BINGHAM 3,240,291
VEHICLE BRAKING SYSTEM

Filed Feb. 10, 1965

INVENTOR.
SIDNEY H. BINGHAM

BY *Darby & Darby*

ATTORNEYS

March 15, 1966 S. H. BINGHAM 3,240,291
VEHICLE BRAKING SYSTEM

Filed Feb. 10, 1965 3 Sheets-Sheet 3

INVENTOR.
SIDNEY H. BINGHAM
BY Darby & Darby
ATTORNEYS

United States Patent Office 3,240,291
Patented Mar. 15, 1966

3,240,291
VEHICLE BRAKING SYSTEM
Sidney H. Bingham, 106 E. 35th St., New York, N.Y.
Filed Feb. 10, 1965, Ser. No. 431,553
6 Claims. (Cl. 188—33)

This invention involves a novel system by means of which additional retarding effort can be applied to vehicles or trains, especially when operated at high speeds, employing guiding or stabilizing wheels through which additional braking effort can be applied.

More specifically, it is an object of this invention to accomplish, through the use of the guiding or stabilizing wheels, an additional braking effort whch can be effected independently of or in combination with the application of braking effort to the main or running wheels of the vehicle.

Many additional and more specific objects of the invention will become more easily appreciated as a result of the following detailed descripton of one embodiment of this invention.

The selected embodiment of the invention is illustrated in the accompanying drawings.

Figure 1:
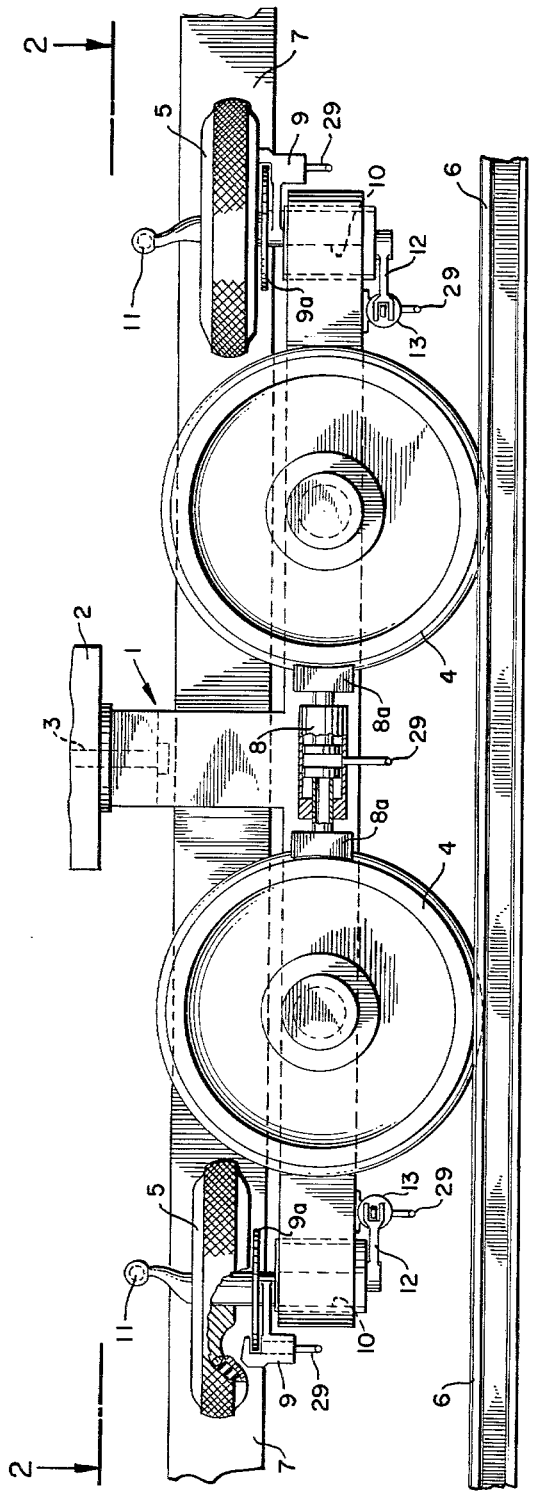
FIGURE 1 is a side elevational view of a vehicle truck to which the invention has been applied, showing most of the parts in elevation with some of the details illustrated being broken-away and sectional parts.
Figure 2:
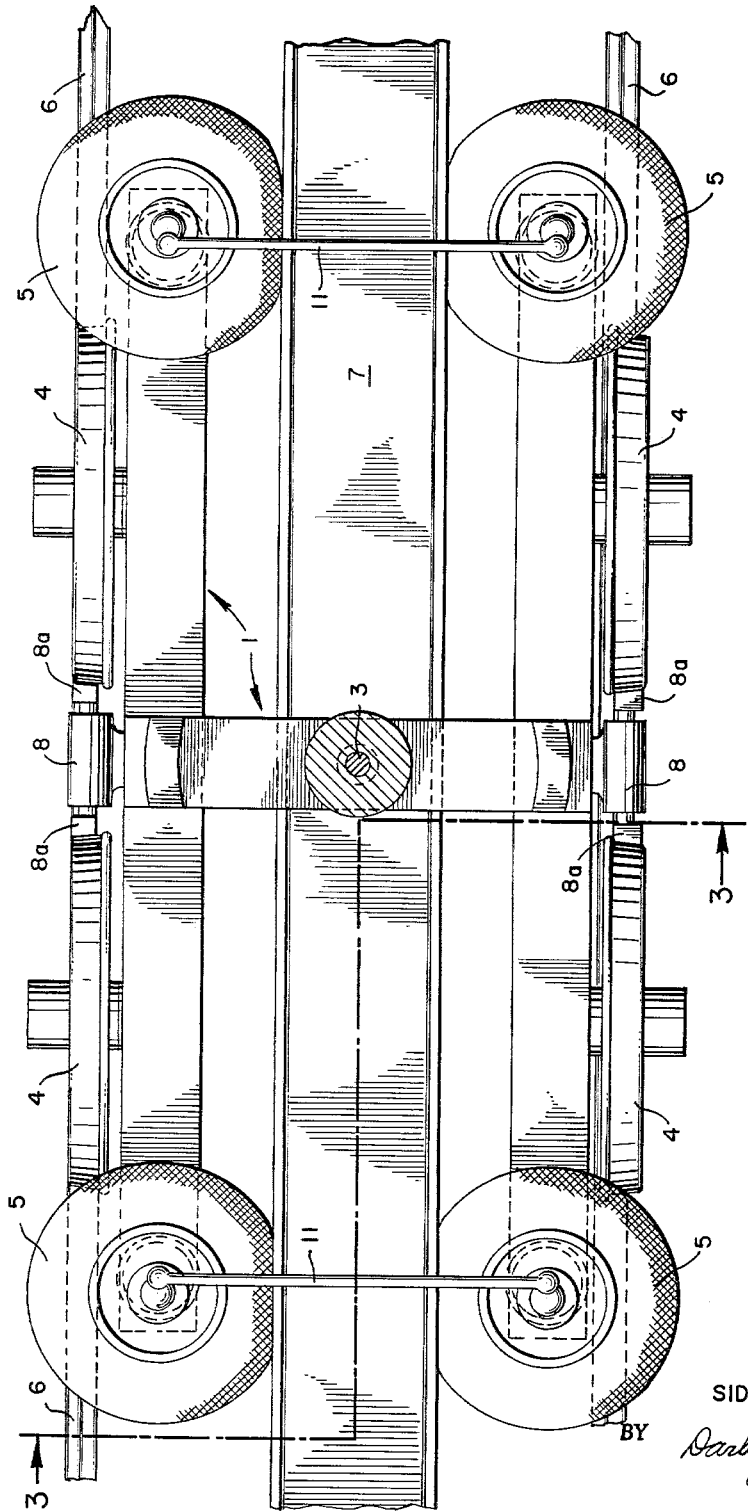
FIGURE 2 is a cross-sectional view taken on the line 2—2 of FIGURE 1.

First of all, it is important to note that it is intended to apply the subject matter of this invention to all forms of railed vehicles operating on a right of way, which includes running rails and a stabilizing or guiding rail.

In its most general applications the vehicle will include at least two trucks like the one illustrated in the drawings, positioned at the respective ends of a suitable truck body and pivotally connected thereto through the usual king pin or other connection. It follows that in a train of two-truck vehicles, especially for high speed operation, the braking system comprising the subject matter of this invention will be applied at least to one truck of each vehicle and probably to both trucks of each vehicle to provide adequate multiple braking effort for the rapid stopping of the train with safety.

It is well understood by those skilled in the art that in the operation of vehicles or trains at speeds of 150–200 miles per hour and higher special provision must be made for the safe braking of the vehicle down to more normal speeds and, of course, in the ultimate to a standstill. At higher rates of braking than those normally achieved with presently available mechanisms, it is apparent that the steel runing wheels easily lock with all the incident dangers and disadvantages.

In accordance with the novelty of this invention it is proposed to provide the vehicle or train with power-driven trucks comprising broadly a carriage on which are journaled running wheels with the usual associated braking mechanism. In addition to operating the running wheels on standard steel rails, it is proposed to provide the trucks with guiding or stabilizing wheels coacting with a third rail acting as a guiding or stabilizing member. In the preferred form the running wheels will be of the usual flange steel type and the stabilizing wheels will be provided with solid or pneumatic tires having a higher coefficient of adherence with the cooperating guiding or stabilizing surfaces. These, therefore, provide a very effective means, as will be explained in accordance with this invention, of applying substantial supplementary braking forces to the vehicle or train.

As will also be apparent, the generation of the braking forces, both for the running and the guiding or stabilizing wheels, can be initiated through the functioning of electric, magnetic, hydraulic, air braking systems and various combinations thereof. The specific types of such mechanism illustrated in the selected embodiment is of the pressure fluid type.

Referring now to the attached drawings, there is illustrated in FIGURE 1 a single truck 1 on which is supported by the king pin 3 a vehicle body member 2, diagrammatically included for the purpose of showing the association of the trucks with the vehicle body regardless of its form. The truck includes a suitably shaped carriage framework, one form of which is illustrated in the figures but provided only in a diagrammatic sense, since the particular carriage construction can take many forms having no special relationship to the novel subject matter herein disclosed. Rotatably supported on the carriage on suitable journals are the flanged steel running wheels 4 arranged to operate on the steel rails 6. Journaled on the carriage on vertical bearings, so as to operate in a horizontal plane, are the guiding or stabilizing wheels 5. As illustrated, these wheels have either solid rubber or pneumatic tires so as to take advantage of the high frictional adherence which they provide with any running surface. As illustrated, the running surface in this case is provided by a centrally positioned guiding or stabilizing rail 7 extending along the right-of-way between the rails 6.

The hydraulic brakes for the running wheels are diagrammatically represented by the pressure fluid engines 8 mounted on the carriage on each side between the associated pairs of running wheels 4. The brakes include brake shoes 8a arranged to engage the surfaces of the steel wheels 4 in the usual manner. Pressure fluid is supplied to each of the engines 8 through the supply lines 28.

The stabilizing wheels 5 are provided with brakes of any suitable form, which, in the case illustrated, include the brake disks 9a. A hydraulic braking mechanism 9 is associated with each of the disks 9a provided with a pressure fluid connection 29.

The shafts on which the wheels 5 are journaled are in turn mounted on eccentric supports 10, which, in turn, are mounted in the carriage framework in any suitable manner. The upper ends of the supports 10 are cross-braced by means of transverse links 11, which aid in equalizing the application of force to the guiding rail through the stabilizing wheels, as will be explained later.

Figure 3:
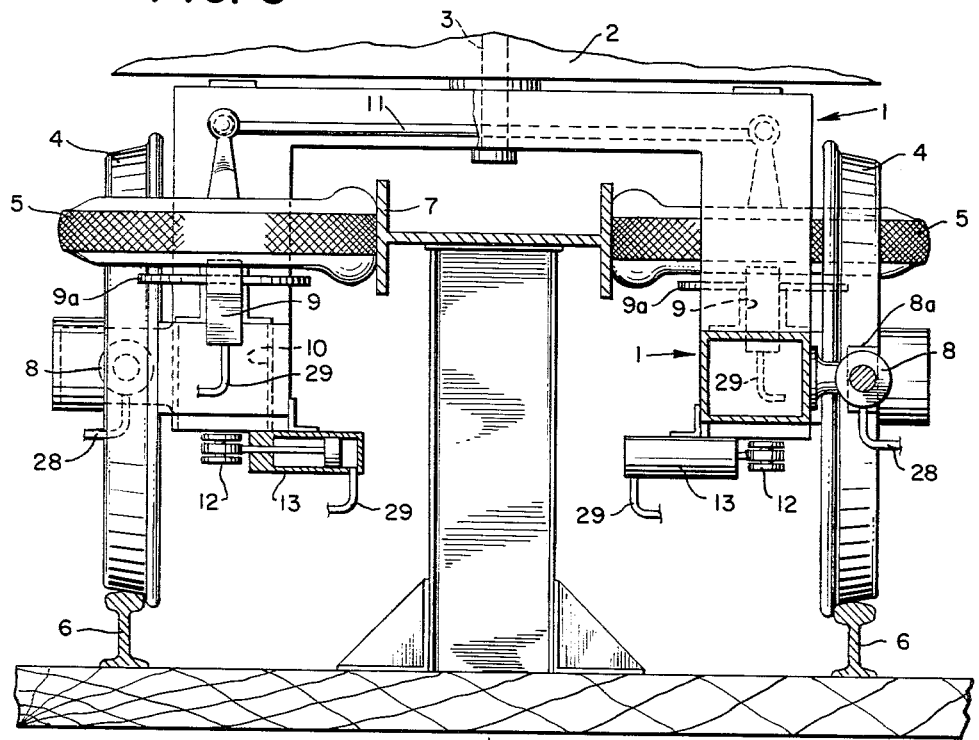
FIGURE 3 is a cross-sectional view taken on the line 3—3 of FIGURE 2.
Figure 4:
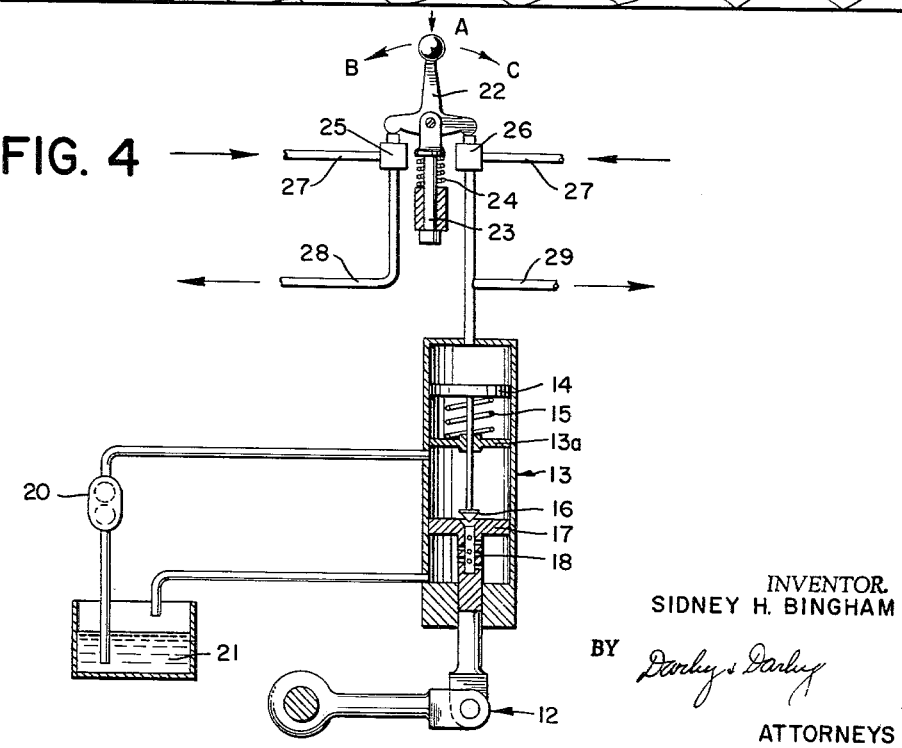
FIGURE 4 is a schematic and diagrammatic illustration of the control system for the braking mechanism incorporated in the structure illustrated in the preceding figures.

The lower end of each of the supports 10 is provided with a crank 12. The cranks 12 coact with the piston rods 19 of the pressure fluid engines 13. These engines, see FIGURE 4, include a cylinder in which a piston 17 may reciprocate under fluid pressure changes. Each piston 17, connected as illustrated to the piston rod 19, has a ported passage 18, as shown. Mounted in the cylinder of the engine is a partition 13a which isolates the upper portion of the cylinder from the lower portion. Pressure fluid is supplied to the chamber comprising the lower portion by means of a constant volume, continuously running pump 20, which delivers any suitable fluid from the fluid body 21 thereunder above the piston 17. A return line is provided for the lower end of this compartment below the piston 17. In the cylinder of engine 13, above the partition 13a is another piston 14, which is biased in an upward direction by means of a compression spring 15. A stem connected to the piston 14 extends through the wall 13a and terminates in a valve member 16, which coacts with a seat formed at the upper end of the venting ports 18. The upper end of the cylinder 13, above the piston 14, is connected by a conduit 27 having a valve 26 therein with any suitable source of pressure fluid (not shown) for operating the braking system. Similarly, that source is also connected by pipe 27 through a control valve 25 to the line 28, which, in turn, connects to each of the running wheel brake cylinders, as indicated in FIGURES 1 and 3. The line 27 to cylinder 13 is provided with a branch pipe 29 which, in turn, connects to each of the pressure fluid operated braking devices to which the line 29 is connected, as previously described. These connections include, in addition to the cylinders 13, the brake cylinders 9. The valves 25 and 26, by means of which the various pressure fluid engines can be selectively or conjointly controlled are provided with a manual control lever 22, which is pivotally mounted on a vertically slidable support 23, biased to a normal position by a compression spring 24.

In describing the operation of this system it will be recognized that the running wheels 4 will be power driven by any suitable form of drive motor to cause movement of the truck and, of course, the vehicle supported by the truck (or trucks) along the right of way. With the control lever 22 in the position shown in FIG. 4 all of the pressure fluid engines controlled thereby are de-energized, the result being that the brakes are released from the running wheels 4, the brakes for the guiding wheels 5 are released, and the guiding wheels engage the guide rail 7 under normal operating or guiding pressures.

In order to bring the vehicle to a stop by gradually retarding it, the operator has the capability of selectively controlling the various braking devices by means of the control lever 22. Normally the first act performed is to rotate the lever 22 forwardly in the direction C, so as to open the valve 26. Pressure fluid is then supplied from the source through the line 27 and that valve into the upper end of the cylinder 13, depressing the piston 14. It will be understood that the constant volume pump 20 is normally operating, so that prior to the actuation of the lever 22 fluid is being constantly transferred from the fluid body 21 through the lower chamber of the cylinder 13. The movement of the piston 14 downwardly will cause the valve 16 to close the escape port 18, so that pressure will build up above the piston 17, causing actuation of the levers 12 through the movement of the piston rods 19. It will be recalled that there is a pressure fluid engine 13 for each of the guide wheels 5. Rotation of the levers 12 will cause rotation of the eccentric 10 causing the guide wheels 5 to be pressed against the guide rail 7, thereby increasing the frictional resistance between the rubber or pneumatic tires of the guide wheels and the guide rail. The actuation of valve 26 also supplies pressure fluid from the source through the lines 29 to the pressure fluid operated braking devices 9 by ways of the lines 29. Thus, braking forces are at the same time applied to the guide wheels, which are now engaging the guide rail under increased pressure.

When conditions permit, the braking forces for the vehicle applied through the guide wheels can be supplemented by the application of the brakes to the running wheels. This can be accomplished by depressing the lever 22 in the direction A, while holding the valve 26 open, so that valve 25 opens. Pressure fluid is then supplied from the source through line 28 to each of the main braking engines 8. This, of course, causes application of the brake shoes 8a to each of the running wheels 4. Thus, the maximum braking forces for the vehicle can be applied.

Under some conditions it will be possible to energize all of the pressure fluid engines 8, 9 and 13 by pressing the control handle 22 downwardly in the direction A so as to simultaneously actuate both valves 25 and 26. It will also be apparent that where conditions permit, at more normal speeds, the braking forces can be applied to the vehicle solely through energization of the braking engines 8, in which case the lever 22 will be rocked in the direction indicated by the reference character B. Under the conditions encountered at more conventional speeds, it may not be necessary to either change the pressure of the guide wheels on the guide rail or apply the brakes for the guide wheels.

From the above it will be seen that the operator has selective control of all the braking devices and that with the exercise of proper discretion it will be possible to effect the retardation of vehicles of this type from various speed levels, whether they be conventional or unusual, by the proper selective actuation of the control lever 22.

From the above description it should be clear to those skilled in the art that the subject matter of this invention is capable of variation in detail without departure from the novel subject matter herein disclosed. It is desired, therefore, that the description be accepted in a purely illustrative sense, it being understood that the scope of novelty herein disclosed is set forth in the appended claims.

What is claimed:

1. A vehicle truck and braking assembly for operation on a right of way, having running and guiding rails, comprising a carriage having running wheels journaled thereon for movement on the running rails, guiding wheels journaled on said carriage so as to engage a guiding rail under running pressure, power operated means for increasing the pressure of said guiding wheels on said guiding rail, power operated brakes for said guiding wheels, and control means for selectively or simultaneously energizing said power operated means and said power operated brakes.

2. In the combination of claim 1 power operated brakes for said running wheels and means forming part of said control means for selectively or simultaneously energizing said power operated brakes for said running wheels, said power operated means for increasing the pressure of said guiding wheels on said guiding rail, and said power operated brakes for said guiding wheels.

3. In the combination of claim 1 said control means including a single operating manual means.

4. In the combination of claim 2, said control means including a single operating manual means.

5. In the combination of claim 1, said guiding wheels having rubber tired peripheries engaging said guiding rail.

6. In the combination of claim 2, said guiding wheels having rubber tired peripheries engaging said guiding rail.

References Cited by the Examiner

UNITED STATES PATENTS

| | | | |
|---|---|---|---|
| 814,422 | 3/1906 | Beatty | 188—39 |
| 2,076,914 | 4/1937 | Newton | 105—215 |
| 2,266,817 | 12/1941 | Schober. | |
| 2,818,139 | 12/1957 | Sutter | 188—4 |
| 3,062,327 | 11/1962 | Debus | 188—5 |

FERGUS S. MIDDLETON, *Primary Examiner.*

DUANE A. REGER, *Examiner.*